United States Patent
Arens et al.

(10) Patent No.: US 11,982,657 B2
(45) Date of Patent: May 14, 2024

(54) METHOD FOR CALIBRATING AT LEAST ONE ANALYTIC DEVICE WITH MULTIPLE REPEATED HARDWARE COMPONENTS

(71) Applicant: Roche Diagnostics Operations, Inc., Indianapolis, IN (US)

(72) Inventors: Nadja Arens, Starnberg (DE); Andrea Geistanger, Munich (DE); Anton Hilger, Munich (DE); Daniel Intelmann, Schaftlach (DE); Shirin Shahriari, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 151 days.

(21) Appl. No.: 17/806,764

(22) Filed: Jun. 14, 2022

(65) Prior Publication Data
US 2022/0308024 A1 Sep. 29, 2022

Related U.S. Application Data

(63) Continuation of application No. PCT/EP2020/086409, filed on Dec. 16, 2020.

(30) Foreign Application Priority Data

Dec. 17, 2019 (EP) .................... 19216960

(51) Int. Cl.
*G01N 30/72* (2006.01)
*G01N 30/86* (2006.01)

(52) U.S. Cl.
CPC ..... *G01N 30/8665* (2013.01); *G01N 30/7233* (2013.01)

(58) Field of Classification Search
CPC ........... G01N 30/8665; G01N 30/7233; G01N 30/72; H01J 49/0009
See application file for complete search history.

(56) References Cited

U.S. PATENT DOCUMENTS

| | | | |
|---|---|---|---|
| 8,384,022 B1 * | 2/2013 | Remes | H01J 49/0009 250/252.1 |
| 2001/0027949 A1 * | 10/2001 | Safir | B01D 15/08 210/635 |

(Continued)

FOREIGN PATENT DOCUMENTS

| | | |
|---|---|---|
| EP | 2811300 A1 | 12/2014 |
| EP | 3425369 A1 | 1/2019 |

(Continued)

OTHER PUBLICATIONS

C62-A Liquid Chromatography-Mass Spectrometry Methods; Approved Guideline, Clinical and Laboratory Standards Institute, 2014, 88 pp.

(Continued)

*Primary Examiner* — David J Bolduc
(74) *Attorney, Agent, or Firm* — Taft Stettinius & Hollister LLP

(57) ABSTRACT

A method for calibrating at least one analytic device with repeated hardware components is disclosed and comprises providing at least one calibrator sample i having a known target value of a concentration of at least one analyte; at least one measuring step, wherein the measuring step comprises conducting at least one measurement on the calibrator sample using the analytic device, wherein at least one detector signal $s_{ijk}$ is acquired; at least one calibration step, wherein a relationship between the detector signal and the concentration of the analyte and/or between the detector signal and a theoretical signal value is determined, wherein the calibration step comprises providing at least one parametrized function; determining calibration values by conducting a calibration based on the parametrized function; and determining an analysis function on basis of an inverse of the parametrized function and the determined calibration values.

19 Claims, 5 Drawing Sheets

(56) References Cited

U.S. PATENT DOCUMENTS

| | | | |
|---|---|---|---|
| 2005/0151073 A1* | 7/2005 | Kato | H01J 49/424 250/282 |
| 2006/0255257 A1 | 11/2006 | Belgovskiy et al. | |
| 2006/0255258 A1* | 11/2006 | Wang | G01N 30/8665 250/282 |
| 2007/0166762 A1 | 7/2007 | Leonard et al. | |
| 2008/0067346 A1* | 3/2008 | Amster | H01J 49/0009 250/282 |
| 2008/0203284 A1* | 8/2008 | Grothe, Jr. | H01J 49/0009 250/252.1 |
| 2009/0048797 A1* | 2/2009 | Tolmachev | H01J 49/0009 702/85 |
| 2011/0161062 A1* | 6/2011 | Paulus | G01N 30/8693 73/61.53 |
| 2012/0083041 A1* | 4/2012 | Martin | H01J 49/0009 436/141 |
| 2013/0234014 A1* | 9/2013 | Remes | H01J 49/0009 250/281 |
| 2014/0260509 A1 | 9/2014 | Pohl | |
| 2018/0166265 A1* | 6/2018 | Geromanos | H01J 49/0031 |
| 2018/0342381 A1* | 11/2018 | Rule | H01J 49/0009 |
| 2018/0350575 A1* | 12/2018 | Hock | H01J 49/004 |
| 2020/0176240 A1* | 6/2020 | McClure | H01J 49/0036 |
| 2020/0217828 A1* | 7/2020 | Regittnig | G01N 30/72 |
| 2020/0335316 A1* | 10/2020 | Madathil | H01J 49/0036 |

FOREIGN PATENT DOCUMENTS

| | | |
|---|---|---|
| WO | 2006/110848 A2 | 10/2006 |
| WO | 2012/170549 A1 | 12/2012 |

OTHER PUBLICATIONS

International Search Report dated Mar. 10, 2021 in Application No. PCT/EP2020/086409, 3 pp.

* cited by examiner

US 11,982,657 B2

METHOD FOR CALIBRATING AT LEAST ONE ANALYTIC DEVICE WITH MULTIPLE REPEATED HARDWARE COMPONENTS

CROSS-REFERENCE TO RELATED APPLICATIONS

This application is a continuation of International Patent Application No. PCT/EP2020/086409, filed 16 Dec. 2020, which claims priority to European Patent Application No. 19216960.5, filed 17 Dec. 2019, the disclosures of which are hereby incorporated by reference in their entirety.

TECHNICAL FIELD

The present disclosure relates to a method for calibrating at least one analytic device, a device for calibrating at least one analytic device, a computer or computer network and a computer program.

BACKGROUND

Generally, several methods are known for calibrating analytical devices. Specifically, in order to obtain concentration values from an analytical device, the analytical device needs to be calibrated. In particular, a relationship between the raw signal of the analytical device and the concentration needs to be established. In order to do so, samples with known concentration values, termed "calibrators", are measured on the analytical device and a function is fitted to the obtained data.

Let f be the calibration function:

$f$: concentration → signal $f_p$(concentration) = signal, where $p=(p_1, p_2, \ldots, p_n)$ with $n \geq 1$, wherein n refers to a number of parameters in the calibration model and wherein p refers to parameters of the calibration function. Generally, the more complex the calibration models become, the more calibrator levels are needed for the establishment of a full calibration model. Calibration curves for mass spectrometry assays are often based on three to eight calibrator levels. For example, reference is made to "Liquid Chromatography-Mass Spectrometry Methods"; Approved Guideline, Clinical and Laboratory Standards Institute (CLSI), document C62-A, Vol. 34 No. 16 2014.

Commonly, new liquid chromatography-mass spectrometry instruments might have hardware settings, where some hardware parts are repeated on the instrument. An example is the use of high-performance liquid chromatography (HPLC) multiplexing to increase the throughput of the system. Currently there are two options that are known for calibration, (1) using individually fitted calibration functions for each high-performance liquid chromatography multiplexing stream or (2) using a single average function for all streams. If now specific hardware parts require individual calibration functions (option (1)), the function f is commonly fitted individually on each part and different values for the estimated parameter values $\hat{p}_i = (\hat{p}_{1i}, \hat{p}_{2i}, \ldots, \hat{p}_{ni})$, $\hat{p}_j = (\hat{p}_{1j}, \hat{p}_{2j}, \ldots, \hat{p}_{nj})$ with $J \geq 1$, wherein J refers to a number of hardware components), are obtained.

Both options may come with distinct disadvantages. If the high-performance liquid chromatography multiplexing streams are not fully comparable, an average calibration function will always produce a bias for analytical results, obtained on an individual stream. On the other hand, a dedicated calibration for each individual stream will result in a very high calibration burden, sometimes not even feasible.

SUMMARY

Although the embodiments of the present disclosure are not limited to specific advantages or functionality, it is noted that in accordance with the present disclosure a method for calibrating at least one analytic device with repeated hardware components, a device for calibrating at least one analytic device with repeated hardware components, a computer or computer network and a computer program are provided, which avoid the above-described disadvantages of known methods, devices, computers and computer programs. In particular, method for calibrating at least one analytic device with repeated hardware components, a device for calibrating at least one analytic device with repeated hardware components, a computer or computer network and a computer program shall reduce a calibration burden of an analytic device with repeated hardware components.

In accordance with one embodiment of the present disclosure, a method for calibrating at least one analytic device with repeated hardware components is provided, wherein the analytic device comprises a plurality of hardware components, wherein hardware components are physical and/or tangible parts of the analytic device, wherein the method comprises the following steps: a) providing at least one calibrator sample i having a known target value of a concentration of at least one analyte; b) at least one measuring step, wherein the measuring step comprises conducting at least one measurement on the calibrator sample using the analytic device (112), wherein at least one detector signal $s_{ijk}$ is acquired, wherein $i=1, \ldots I$ with $I \geq 2$, wherein i refers to the number of the calibrator sample, $j=1, \ldots J$ with $J \geq 2$, wherein j refers to the number of the hardware component, wherein $k=1, \ldots K_{ij}$ with $K_{ij} \geq 1$, wherein k refers to the number of repetition of the measurement step; c) at least one calibration step, wherein a relationship between the detector signal and the concentration of the analyte is determined, wherein the calibration step comprises: c.1: providing at least one parametrized function, wherein the parametrized function has a set of parameters, wherein the set of parameters comprises parameters describing an analyte-specific part of the parametrized function, wherein the set of parameters further comprises parameters for an adjustment of the parametrized function to the hardware components; c.2: determining calibration values by conducting a calibration based on the parametrized function; and c.3: determining an analysis function on basis of an inverse of the parametrized function and the determined calibration values.

In accordance with another embodiment of the present disclosure, a method for calibrating at least one analytic device with repeated hardware components is provided, wherein the analytic device comprises a plurality of hardware components, wherein hardware components are physical and/or tangible parts of the analytic device, wherein the method comprises the following steps: A) providing at least one calibrator sample i having a known target value of a concentration of at least one analyte and a mean calibration curve, from which theoretical signals of the at least one calibrator sample are derived; B) at least one measuring step, wherein the measuring step comprises conducting at least one measurement on the calibrator sample using the analytic device, wherein at least one detector signal $s_{ijk}$ is acquired, wherein $i=1, \ldots I$ with $I \geq 1$, wherein i refers to the number of the calibrator sample, $j=1, \ldots J$ with $J \geq 2$, wherein j refers to the number of the hardware component, wherein k=1, ... $K_{ij}$ with $K_{ij} \geq 1$, wherein k refers to the number of repetition of the measurement step; C) at least one calibration step, wherein a relationship between the detector signal and a theoretical signal value is determined, wherein the calibration step comprises: providing at least one parametrized function, wherein the parametrized function has a set of parameters, wherein the set of parameters comprises parameters describing an analyte-specific part of the parametrized function, wherein the set of parameters further comprises parameters for an adjustment of the parametrized function to the hardware components; determining calibration values by conducting a calibration based on the parametrized function; and determining an analysis function on basis of an inverse of the parametrized function and the determined calibration values.

In accordance with yet another embodiment of the present disclosure, a device for calibrating at least one analytic device with repeated hardware components, wherein hardware components are physical and/or tangible parts of the analytic device, the device comprising: at least one analytic device comprising a plurality of hardware components, wherein the analytic device is configured for conducting at least one measurement on a calibrator sample i having a known target value of a concentration of at least one analyte, wherein the analytic device is configured to acquire at least one detector signal sijk, wherein i=1, ... 1 with l≥2, wherein i refers to the number of the calibrator sample, j=1, ... J with J≥2, wherein j refers to the number of the hardware component, wherein k=1, ... Kij with Kij≥1, wherein k refers to the number of repetition of a measurement step; and at least one evaluation device, wherein the evaluation device is configured for conducting at least one calibration step, wherein a relationship between the detector signal and the concentration of the analyte and/or between the detector signal and a theoretical signal value is determined, wherein the evaluation device is configured for providing at least one parametrized function, wherein the parametrized function has a set of parameters, wherein the set of parameters comprises parameters describing an analyte-specific part of the parametrized function, wherein the set of parameters further comprises parameters for an adjustment of the parametrized function to the hardware components, wherein the evaluation device is further configured for determining calibration values by conducting a calibration based on the parametrized function, wherein the evaluation device is further configured for determining an analysis function on basis of an inverse of the parametrized function and the determined calibration values.

These and other features of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
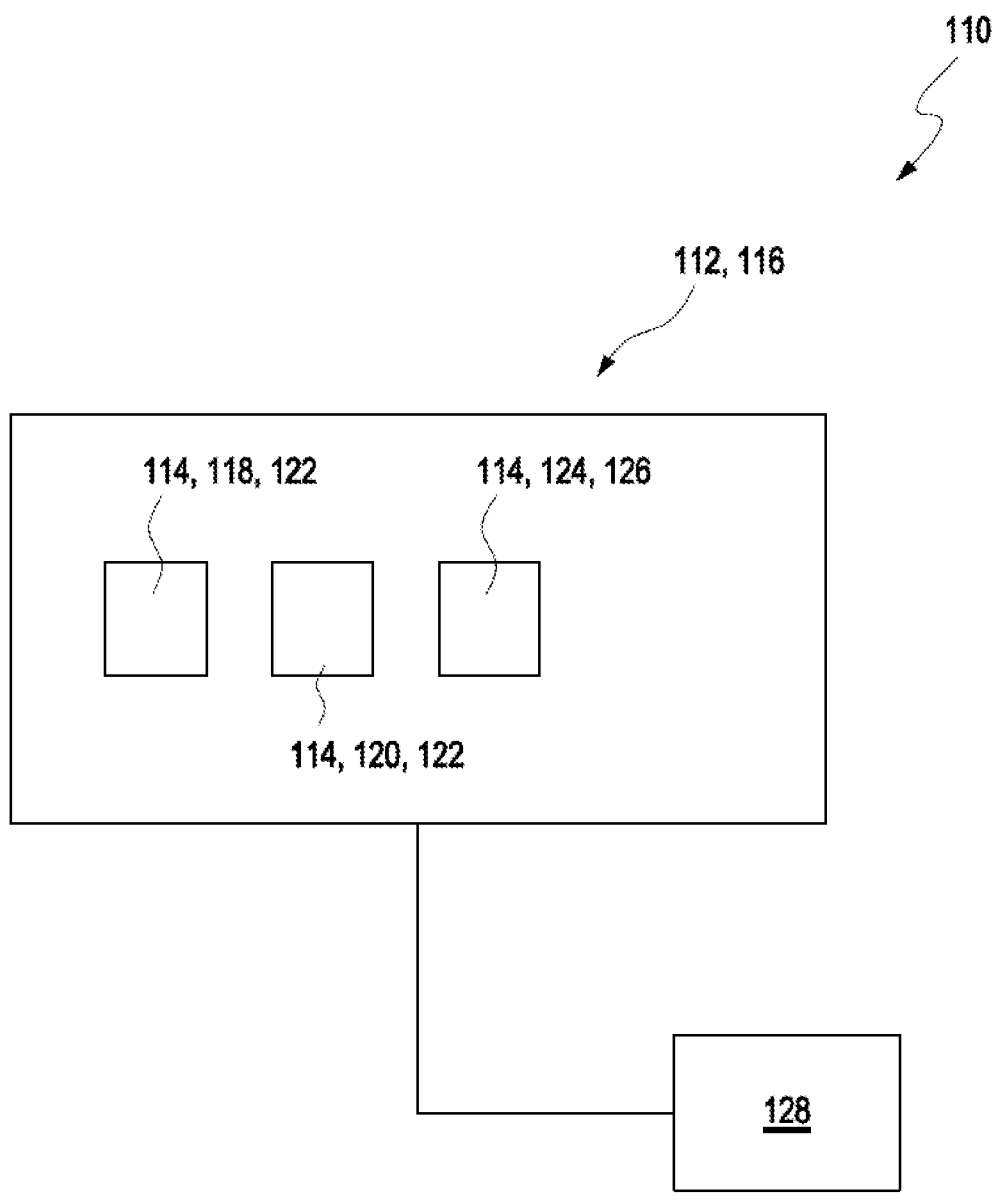
FIG. 1 shows an exemplary embodiment of a device for calibrating at least one analytic device in accordance with an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, as used in the following, the terms "typically", "more typically", "particularly", "more particularly", "specifically", "more specifically" or similar terms are used in conjunction with optional features, without restricting alternative possibilities. Thus, features introduced by these terms are optional features and are not intended to restrict the scope of the claims in any way. The present disclosure may, as the skilled person will recognize, be performed by using alternative features. Similarly, features introduced by "in an embodiment of the disclosure" or similar expressions are intended to be optional features, without any restriction regarding alternative embodiments of the present disclosure, without any restrictions regarding the scope of the present disclosure and without any restriction regarding the possibility of combining the features introduced in such way with other optional or non-optional features of the present disclosure.

The term "analytic device" as used herein is a broad term and is to be given its ordinary and customary meaning to a person of ordinary skill in the art and is not to be limited to a special or customized meaning. The term specifically may refer, without limitation, to an arbitrary device which is configured for performing at least one analytical detection. As further used herein, the term "detection" refers to a process of determining a presence and/or a quantity and/or a concentration of at least one analyte in a sample. Thus, the detection may be or may comprise a qualitative detection, simply determining the presence of the at least one analyte or the absence of the at least one analyte, and/or may be or may comprise a quantitative detection, which determines the quantity and/or the concentration of the at least one analyte.

Specifically, the analytic device may be a device for the determination of the concentration of an analyte in a sample such as in a fluid. The term "analyte" generally refers to an arbitrary element, component or compound which may be present in a sample and the presence and/or the concentration of which may be of interest for a user, a patient or medical staff such as a medical doctor. Particularly, the analyte may be or may comprise an arbitrary chemical substance or chemical compound which may take part in the metabolism of the user or the patient, such as at least one metabolite. The detection of the at least one analyte specifically may be an analyte-specific detection. However, also other kinds of analytes may be feasible.

The term "concentration" as used herein is a broad term and is to be given its ordinary and customary meaning to a person of ordinary skill in the art and is not to be limited to a special or customized meaning. The term specifically may refer, without limitation, to an abundance of a constituent divided by a total volume of a mixture such as a solute and/solvents in solution. The concentration may be described by different kinds of quantities such as by a mass concentration, by a molar concentration, by a number concentration or by a volume concentration.

Specifically, the analytic device may be selected from the group consisting of: a mass spectrometry device, specifically a liquid chromatography mass spectrometry device; an immunoassay analyzer; a photometric measurement device, blood gas analyzers, hematology analyzers, DNA analyzers. However, also other kinds of analytic devices may be feasible.

As used herein, the term "mass spectrometry (MS) device" is a broad term and is to be given its ordinary and customary meaning to a person of ordinary skill in the art and is not to be limited to a special or customized meaning. The term specifically may refer, without limitation, to a mass analyzer configured for detecting at least one analyte based on mass to charge ratio. The mass spectrometry device may be or may comprise at least one quadrupole mass spectrometry device. The interface coupling the LC device and the MS may comprise at least one ionization source configured for generating of molecular ions and for transferring of the molecular ions into the gas phase.

As used herein, the term "liquid chromatography (LC) device" is a broad term and is to be given its ordinary and customary meaning to a person of ordinary skill in the art and is not to be limited to a special or customized meaning. The term specifically may refer, without limitation, to an analytical module configured to separate one or more analytes of interest of a sample from other components of the sample for detection of the one or more analytes with the mass spectrometry device. The LC device may comprise at least one LC column. For example, the LC device may be a single-column LC device or a multi-column LC device having a plurality of LC columns. The LC column may have a stationary phase through which a mobile phase is pumped in order to separate and/or elute and/or transfer the analytes of interest.

As used herein, the term "liquid chromatography mass spectrometry (LC-MS) device" is a broad term and is to be given its ordinary and customary meaning to a person of ordinary skill in the art and is not to be limited to a special or customized meaning. The term specifically may refer, without limitation, to a combination of liquid chromatography with mass spectrometry. The liquid chromatography mass spectrometry device may be or may comprise at least one high-performance liquid chromatography (HPLC) device or at least one micro liquid chromatography (μLC) device. The liquid chromatography mass spectrometry device may comprise a liquid chromatography (LC) device and a mass spectrometry (MS) device, wherein the LC device and the MS are coupled via at least one interface.

The analytic device may specifically be embodied as an analytical system comprising repeated hardware components such as a plurality of repeated hardware components. Specifically, the analytic device may comprise a plurality of hardware components. The term "component" is a broad term and is to be given its ordinary and customary meaning to a person of ordinary skill in the art and is not to be limited to a special or customized meaning. The term specifically may refer, without limitation, to a part of the analytic device, in particular of the analytical system. The components may be configured to interact with another, e.g., in order to fulfill at least one common function of the system. The components may be handled independently or may be coupled, connectable or integratable with each other. The term "hardware" may generally refer to a physical and/or tangible part of the analytical device. The term "hardware component" is a broad term and is to be given its ordinary and customary meaning to a person of ordinary skill in the art and is not to be limited to a special or customized meaning. The term specifically may refer, without limitation, to a part, specifically, to a physical and/or tangible part, of the analytic device. The hardware component may also be referred to as hardware piece. The term "repeated hardware components" is a broad term and is to be given its ordinary and customary meaning to a person of ordinary skill in the art and is not to be limited to a special or customized meaning. The term specifically may refer, without limitation, to the fact that hardware components of the analytical device are present at least two-times. For example, the analytic device may be an HPLC multiplexing device. The term "multiplexing" may refer to that multiple LC systems are run simultaneously into a single mass spectrometry device. Each of the LC systems may be individual and/or separate from the other LC systems. For example, the analytic device may comprise a plurality of concurrent HPLC separations with a single mass spectrometry device. The hardware components may be selected from the group consisting of: a column, specifically a high performance liquid chromatography column; a stream, specifically a high performance liquid chromatography stream; a sample injection device, specifically a high performance liquid chromatography injection device; a pump; a measurement cell; a detector, specifically a mass spectrometric detector. Also other components may be feasible.

The hardware components may be equivalent hardware components. The term "equivalent" may refer to an equality in an embodiment and/or a function of two or more devices. Thus, a first hardware component and a second hardware component of the analytic device may fulfill a same function and/or may be identical in its construction and/or structure. Exemplarily, the first hardware component may be a high performance liquid chromatography column and the second hardware component may be a high performance liquid chromatography column as well. Specifically, the calibrator sample may go through some or all of the hardware components or may be transported via some or all of the hardware components. However, also other embodiments may be feasible.

The terms "calibration" and "calibrating" are broad terms and are to be given its ordinary and customary meaning to a person of ordinary skill in the art and are not to be limited to a special or customized meaning. The terms specifically may refer, without limitation, to an operation or process of operation for determining a relationship between a raw signal of the analyte determined by of the analytic device, such as of the mass spectrometry device, and the concentration of the analyte. Specifically, the calibration may be or may comprise an operation or a process of operation that, under specified conditions, in a first step, establishes a relation between quantity values with measurement uncertainties provided by measurement standards and corresponding indications with associated measurement uncertainties, specifically of a calibrated instrument or secondary standard and, in a second step, uses this information to establish a relation for obtaining a measurement result from an indication. Specifically, the terms "calibration" and "calibrating" may comprise a determination of a concentration of a sample on basis of a measurement signal of a sample and/or a determining of afunctional interrelation between a measurement signal and a concentration of a sample. In known methods for calibrating analytic devices having repeated hardware components, e.g., HPLC devices, individually fitted calibration functions for each hardware component, e.g., each HPLC multiplexing stream, or a single average function for all hardware components, e.g., all streams, are used. Both options may come with distinct disadvantages. If the HPLC multiplexing streams are not fully comparable, an average calibration function will always produce a bias for analytical results, obtained on an individual stream. On the other hand, a dedicated calibration for each individual stream will result in a very high calibration burden, sometimes not even feasible. The present disclosure proposes a linked calibration process. With this approach calibration burden on the instrument is lower than with the common individual stream calibration. On the other side the adjustment of the calibration function for each stream may be ensured. Simplified the present disclosure proposes an average calibration function over all streams with stream individual adjustment factors.

The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises the following steps:
a) providing at least one calibrator sample i having a known target value of a concentration of at least one analyte;
b) at least one measuring step, wherein the measuring step comprises conducting at least one measurement on the calibrator sample using the analytic device, wherein at least one detector signal $s_{ijk}$ is acquired, wherein i=1, . . . I with I≥2, wherein i refers to the number of the calibrator sample, j=1, . . . J with J≥2, wherein j refers to the number of the hardware component, wherein k=1, . . . $K_{ij}$ with $K_{ij}$≥1, wherein k refers to the number of repetition of the measurement step;
c) at least one calibration step, wherein a relationship between the detector signal and the concentration of the analyte and/or between the detector signal and a theoretical signal value is determined, wherein the calibration step comprises:
  c.1: providing at least one parametrized function, wherein the parametrized function has a set of parameters, wherein the set of parameters comprise parameters describing an analyte specific part of the parametrized function, wherein the set of parameters further comprise parameters for an adjustment of the parametrized function to the hardware components;
  c.2: determining calibration values by conducting a calibration based on the parametrized function; and
  c.3: determining an analysis function on basis of an inverse of the parametrized function and the determined calibration values.

The method may specifically be a computer-implemented method. The term "computer implemented method" as used herein is a broad term and is to be given its ordinary and customary meaning to a person of ordinary skill in the art and is not to be limited to a special or customized meaning. The term specifically may refer, without limitation, to a method involving at least one computer and/or at least one computer network. The computer and/or computer network may comprise at least one processor which is configured for performing at least one of the method steps of the method according to an embodiment of the present disclosure. Typically, each of the method steps is performed by the computer and/or computer network. The method may be performed completely automatically, specifically without user interaction. The term "automatically" as used herein is a broad term and is to be given its ordinary and customary meaning to a person of ordinary skill in the art and is not to be limited to a special or customized meaning. The term specifically may refer, without limitation, to a process which is performed completely by means of at least one computer and/or computer network and/or machine, in particular without manual action and/or interaction with a user.

The method steps b) to c) may be performed fully automatic. For example, the method steps may be performed by at least one computer-implementable processing line.

The term "step" may generally refer to a work step, a process step or a stage of an operation or a procedure. Thus, the term "calibration step" may refer to a stage of an operation, which comprises a conducting of a calibration. Further, the term "measurement step" may refer to a stage of an operation, which comprises a conducting of a measurement.

As used herein, the term "sample" is a broad term and is to be given its ordinary and customary meaning to a person of ordinary skill in the art and is not to be limited to a special or customized meaning. The term specifically may refer, without limitation, to an arbitrary sample such as a biological sample, also called test sample, a quality control sample. The sample may comprise one or more analytes of interest. For example, the sample may be selected from the group consisting of: a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue, cells or the like. The sample may be used directly as obtained from the respective source or may be subject of a pretreatment and/or sample preparation workflow. For example, the sample may be pretreated by adding an internal standard and/or by being diluted with another solution and/or by having being mixed with reagents or the like. For example, analytes of interest may be vitamin D, drugs of abuse, therapeutic drugs, hormones, and metabolites in general.

The term "calibrator sample", also denoted "calibrator", is a broad term and is to be given its ordinary and customary meaning to a person of ordinary skill in the art and is not to be limited to a special or customized meaning. The term specifically may refer, without limitation, to an arbitrary sample having a known concentration value. The calibrator sample has a known target value. As used herein, the term "known target value" is a broad term and is to be given its ordinary and customary meaning to a person of ordinary skill in the art and is not to be limited to a special or customized meaning. The term specifically may refer, without limitation, to known values of one or more parameters of a calibrator sample, specifically a known concentration of a substance. The substance may be identical to the analyte of interest or may be an analyte which generates by reaction or derivatization an analyte identical to the analyte of interest and/or may be an analyte of which the concentration is known and/or may be a substance which mimics the analyte of interest or that can be otherwise correlated to a certain analyte of interest.

The method may comprise providing the at least one calibrator sample i having a known target value of a concentration of at least one analyte and a mean calibration curve, from which theoretical signals of the at least one calibrator sample are derived. The mean calibration curve may be a relationship between a signal of an analytic device and a concentration of the analyte non-instrument specific. For example, measurements on a plurality of reference analytic devices may be conducted and a plurality of calibration curves may be determined. On basis of the calibration curves the mean calibration curve may be calculated.

The method for calibrating the analytic device comprises at least one measuring step b). Specifically, step b) may be conducted on each of the hardware components. As outlined above, step b) may comprise acquiring the at least one detector signal. As used herein, the term "detector", is a broad term and is to be given its ordinary and customary meaning to a person of ordinary skill in the art and is not to be limited to a special or customized meaning. The term specifically may refer, without limitation, to an apparatus configured for detecting incoming ions. The detector may be configured for detecting charged particles. The detector may be or may comprise at least one electron multiplier. The detector may be configured to determining at least one mass spectrum of the detected ions. As used herein, the term "mass spectrum" is a broad term and is to be given its ordinary and customary meaning to a person of ordinary skill in the art and is not to be limited to a special or customized meaning. The term specifically may refer, without limitation, to a two dimensional representation of signal intensity vs the charge-to-mass ratio m/z, wherein the signal intensity corresponds to abundance of the respective ion. The mass spectrum may be a pixelated image. For determining resulting intensities of pixels of the mass spectrum, signals detected with the detector within a certain m/z range may be integrated. The analyte in the sample may be identified by at least one evaluation device. Specifically, the evaluation device may be configured for correlating known masses to the identified masses or through a characteristic fragmentation pattern. Thus, the term "detector signal" may refer to a signal acquired by the detector. The detector signal may specifically be referred to as a raw signal. The detector signal may be acquired for a desired calibrator sample. Thus, for each or at least some of the calibrator samples, a separate detector signal may be acquired. Further, the detector signal may be acquired and/or measured on a desired hardware component. As outlined above, the analytic device comprises a plurality of hardware components. The detector signal may be acquired for a desired hardware component. Thus, for each or at least some of the hardware components, a separate detector signal may be acquired. Further, an acquisition of a detector signal, specifically for a desired calibrator sample and/or for a desired hardware component may be conducted several times, e.g., the acquisition of the detector signal may be conducted repeatedly.

As outlined above, the detector signal may be denoted with $s_{ijk}$. i refers to the number of the calibrator sample. Specifically, the method for calibrating at least one analytic device may be conducted several times. Thereby, for each procedure, a new calibrator sample may be utilized. Specifically, the number of the calibrator sample may correspond to a number of the procedure. However, also different approaches may be feasible. Further, j refers to the number of the hardware component. j may refer to a number of all hardware components of the analytic device or may refer to a number of a portion of all hardware components of the analytic device. Specifically, j may refer to a number of equivalent hardware components. k refers to the number of repetition of the measurement step. The measurement step, specifically step b), may be repeated several times. Specifically, step b) may be repeated several times before step c) is conducted.

In step c.1 a parametrized function is provided. The term "function" is a broad term and is to be given its ordinary and customary meaning to a person of ordinary skill in the art and is not to be limited to a special or customized meaning. The term specifically may refer, without limitation, to a mathematical function. The function may comprise one or more variables and, optionally, one or more parameters. Specifically, the function may assign a value to a functional value. The function may exemplarily be a linear function or a quadratic function. However, also other embodiments may be feasible. The term "parameter" generally refers to an arbitrary quantity which influences an output or a behavior of a mathematical function but is viewed as being held constant. Thus, the parameter may be configured for determining a behavior of the mathematical function. To the contrary, a variable of a mathematical function may be reviewed as changing the parameter typically either does not change or changes more slowly. The term "set of parameters" may generally refer to a plurality of parameter of a single mathematical function. The term "parametrized function" is a broad term and is to be given its ordinary and customary meaning to a person of ordinary skill in the art and is not to be limited to a special or customized meaning. The term specifically may refer, without limitation, to an arbitrary mathematical function having at least one parameter, specifically at least two parameters.

The set of parameters may comprise at least two groups. A first group of the set of parameters may correspond to parameters describing an analyte-specific part of the parametrized function. A second group of the set of parameters may correspond to parameters for an adjustment of the parametrized function to the hardware components.

Thus, the parameters describing an analyte specific part of the parametrized function and the parameters for an adjustment of the parametrized function to the hardware components may be expressed by different parameters. A total set of parameters comprising the parameters describing an analyte specific part of the parametrized function and the parameters for an adjustment of the parametrized function to the hardware components may be expressed by $$p=(p_1,p_2,\ldots p_n,h_1,h_2,\ldots h_r)$$

wherein n and rare positive integers, wherein $p_1, p_2, \ldots p_n$ correspond to the parameters describing the analyte specific part of the parametrized function, wherein $h_1, h_2, \ldots h_r$ refer to vectors describing the parameters for the adjustment of the parametrized function to the hardware components. $h_1, h_2, \ldots h_r$ may correspond to parameter vectors. Each parameter vector $h_r=h_{1r},\ldots h_{Lr}$ may be a set of L parameters with L being a positive integer. The more parameters are utilized, the more accurate a fitting of data may be conducted. Thus, the separation of the set of parameters into a first group of parameters describing an analyte specific part of the parametrized function and into a second group of parameters for an adjustment of the parametrized function may lead to an improved fitting result.

The set of parameters comprises parameters describing an analyte specific part of the parametrized function. The term "parameter describing an analyte specific part" is a broad term and is to be given its ordinary and customary meaning to a person of ordinary skill in the art and is not to be limited to a special or customized meaning. The term specifically may refer, without limitation, to parameters which reflect the relationship between the raw signal of the analyte and the concentration, but not an adjustment based on specific hardware settings. For example, if multiple compounds may be analyzed, the parameters for individual compounds may be different.

The term "parameter for an adjustment of the parametrized function to the hardware components" is a broad term and is to be given its ordinary and customary meaning to a person of ordinary skill in the art and is not to be limited to a special or customized meaning. The term specifically may refer, without limitation, to parameters reflecting adjustments based on specific hardware settings. The parameter for an adjustment of the parametrized function to the hardware components relate to influences on the detector signal caused by individual hardware components of the analytic device. In order to determine these parameters, calibrator samples may be measured on each individual hardware component, wherein the information from which of the hardware components the signal comes from may also be entered into the fitting process. As all hardware components may be regarded together for the fitting process, less measurements with calibrators may be needed to obtain reliable calibration curves for all hardware components, compared with known approaches where each hardware component is regarded individually. In addition, quality checks on the signals over the different hardware components can be made, which is not possible in case of the individual calibration of each hardware component.

As outlined above, step c.2 comprises determining calibration values by conducting a calibration based on the parametrized function. The step c.2 may specifically comprise a determining of values of the parameters of the set of parameters. Further, specifically, a fitting of the detector signal may be conducted.

The term "value" as further used herein may refer to a value of a parameter of a mathematical function. The term "calibration value" as further used herein may refer to a value of a parameter of an arbitrary calibration function. Specifically, the calibration value may refer to a value of one of the parameters of the set of parameters of the parametrized function. The term "conducting a calibration based on the parametrized function" may refer to conducting a calibration by using the parametrized function. Specifically, a fitting, e.g., a constructing of a mathematical function of a series of data points, specifically of a detector signal, may be conducted. Thus, values of parameters of the mathematical function may be obtained. Specifically, the calibration values may be expressed by $\hat{p} = \hat{p}_1, \hat{p}_2, \ldots \hat{p}_n, \hat{h}_1, \hat{h}_2, \ldots \hat{h}_r$.

In step c.3, the calibration step further comprises a determining an analysis function on the basis of the inverse of the parametrized function and the determined calibration values. Via the analysis function a concentration can be determined from the detector signal. The term "analysis function" may generally refer to an arbitrary function which is configured for determining a parameter of a sample, such as a concentration, from the measured detector signal. Thus, the analysis function may describe a relationship between the parameter of the sample, such as the concentration, and the measured detector signal. The analysis function may be determined on basis of a calibration function. Specifically, the analysis function may be formed by an inverse of the calibration function.

The parametrized function with the determined calibration values may be denoted calibration function or signal-concentration-function. The calibration function may be defined by $$f_p(\text{concentration}) = \text{detector signal}.$$

The calibration function may specifically be a linear function. The calibration function may comprise one or both of a hardware component specific intercept, a hardware component specific slope.

Exemplarily, the calibration function may be expressed by $$S_{ijk} = \mu + \alpha_j + b \cdot C_i + \varepsilon_{ijk}$$

wherein $\varepsilon_{ijk}$ corresponds to a random area which is normally distributed with mean 0 and variance $\sigma_\varepsilon^2$. $S_{ijk}$ corresponds to the detector signal, $C_i$ corresponds to the target value of the ith calibrator sample, wherein i=1, ... l with l≥2, wherein i refers to the number of the calibrator samples, j=1, ... J with J≥2, wherein j refers to the number of the hardware components, wherein k=1, ... $K_{ij}$ with $K_{ij}$≥1, wherein k refers to the number of repetitions of the measurement step.

Further, exemplarily, the calibration function may be expressed by $$S_{ijk} = \mu + b_j \cdot C_i + \varepsilon_{ijk}$$

wherein $\varepsilon_{ijk}$ corresponds to a random area which is normally distributed with mean 0 and variance $\sigma_\varepsilon^2$. $S_{ijk}$ corresponds to the detector signal, $C_i$ corresponds to the target value of the ith calibrator sample, wherein i=1, ... l with l≥2, wherein i refers to the number of the calibrator samples, j=1, ... J with J≥2, wherein j refers to the number of the hardware components, wherein k=1, ... $K_{ij}$ with $K_{ij}$≥1, wherein k refers to the number of repetitions of the measurement step.

Further, exemplarily, the calibration function may be expressed by $$S_{ijk} = \mu + \alpha_j + b_j \cdot C_i + \varepsilon_{ijk}$$

wherein $\varepsilon_{ijk}$ corresponds to a random area which is normally distributed with mean 0 and variance $\sigma_\varepsilon^2$. $S_{ijk}$ corresponds to the detector signal, $C_i$ corresponds to the target value of the ith calibrator sample, wherein i=1, ... l with l≥2, wherein i refers to the number of the calibrator samples, j=1, ... J with J≥2, wherein j refers to the number of the hardware components, wherein k=1, ... $K_{ij}$ with $K_{ij}$≥1, wherein k refers to the number of repetitions of the measurement step.

Further, exemplarily, the calibration function may be expressed by $$S_{ijk} = (p_1 + p_2 \cdot C_i) \cdot h_j + \varepsilon_{ijk}$$

wherein $S_{ijk}$ corresponds to the detector signal, $C_i$ corresponds to the target value of the ith calibrator sample, wherein i=1, ... l with l≥2, wherein i refers to the number of the calibrator samples, j=1, ... J with J≥2, wherein j refers to the number of the hardware components, wherein k=1, ... $K_{ij}$ with $K_{ij}$≥1, wherein k refers to the number of repetitions of the measurement step. $p_1$, $p_2$, describe the analyte specific calibration parameters, $h_1, \ldots, h_J$ describe the hardware-piece specific adjustment factor. $\varepsilon_{ijk}$ corresponds to a random area which is normally distributed with mean 0 and variance $\sigma_\varepsilon^2$.

The method according to the present disclosure can be allied to a full calibration of the analytic device as well as for a recalibration approach.

For example, step c) may correspond to a full calibration of the analytic device. The full calibration may comprise the determining of the relationship between the detector signal and the concentration of the analyte. The full calibration may be performed, for example, during initial setup of the analytic device. The full calibration may be performed repeatedly.

Further, step c) may correspond to a recalibration of the analytic device. In this case, only a signal adjustment function is determined on the analytic device. The signal adjustment function may be defined by $$g_p(\text{theoretical signal}) = \text{detector signal}.$$

Thus, additionally or alternatively, during the calibration step, a relationship between the detector signal and a theoretical signal may be determined. The terms "theoretical signal value" and "theoretical signal" may generally refer to a signal which is determined via conducting one or more measurements via one or more different analytic devices, such as reference analytic device, and via determining a mean signal value based on the one or more measurements. For example, the calibration process may comprise at least two steps, a first step and a second step. The first step may comprise a determining of a relationship between a signal of an analytic device and a concentration of the analyte non-instrument specific. Exemplarily, for this purpose, measurements on three reference analytic devices are conducted and three different calibration curves are determined. On basis of the three different calibration curves a mean calibration curve may be calculated. The second step may comprise an adjustment to the analytic device to be calibrated. Thus, an adjustment of the detector signal to the theoretical signal is conducted. Thus, the parametrized function may be the signal adjustment function. Exemplarily, the signal-adjustment-function may be expressed by $$S_{ijk} = (p_1 + p_2 \cdot \text{Stheor}_i) \cdot h_j + \varepsilon_{ijk},$$

wherein $S_{ijk}$ corresponds to the detector signal, $\text{Stheor}_i$ corresponds to the theoretical signal of the ith calibrator sample, wherein $i=1, \ldots l$ with $l \geq 2$, wherein i refers to the number of the calibrator samples, $j=1, \ldots J$ with $J \geq 2$, wherein j refers to the number of the hardware components, wherein $k=1, \ldots K_{ij}$ with $K_{ij} \geq 1$, wherein k refers to the number of repetitions of the measurement step. $p_1$, $p_2$, describe the analyte specific calibration parameters, $h_1, \ldots, h_J$ describe the hardware-piece specific adjustment factor. $\varepsilon_{ijk}$ corresponds to a random area which is normally distributed with mean 0 and variance $\sigma_\varepsilon^2$.

As outlined above, the relationship between the detector signal and the concentration of the analyte and/or between the detector signal and a theoretical signal value is determined in step c). During commissioning of the analytic device, a full calibration may be conducted. At a later point in time, specifically during usage of the analytic device, a recalibration may be conducted. Optionally, at a later point in time such as during usage of the analytic device a full calibration may be conducted.

The method may further comprise conducting at least one measurement of a sample having an unknown concentration of at least one analyte. By using the analysis function, concentration of the sample may be determined on basis of a measurement signal of the sample. The measurement signal may be a detector signal. Specifically, the measurement signal may correspond to the detector signal as obtained in step b) of the method for calibrating at least one analytic device. However, the measurement signal may also correspond to a detector signal obtained in a separate measurement step. The further sample may correspond to the calibrator sample as utilized in step a) of the method for calibrating at least one analytic device. However, the further sample also corresponds to a sample which is different from the calibrator sample as utilized in step a) of the method for calibrating at least one analytic device.

In a further aspect of the present disclosure, a device for calibrating at least one analytic device with repeated hardware components is disclosed. The device comprises the analytic device comprising a plurality of hardware components. The analytic device is configured for conducting at least one measurement on a calibrator sample with i having a known target value of a concentration of at least one analyte. The analytic device is configured to acquire at least one detector signal $s_{ijk}$, wherein $i=1, \ldots l$ with $l \geq 2$, wherein i refers to the number of the calibrator sample, $j=1, \ldots J$ with $J \geq 2$, wherein j refers to the number of the hardware component, wherein $k=1, \ldots K_{ij}$ with $K_{ij} \geq 1$, wherein k refers to the number of repetition of a measurement step.

Further, the device comprises at least one evaluation device. The evaluation device is configured for conducting at least one calibration step, wherein a relationship between the detector signal and the concentration of the analyte and/or between the detector signal and a theoretical signal value is determined. Further, the evaluation device is configured for providing at least one parametrized function, wherein the parametrized function has a set of parameters. The set of parameters comprises parameters describing an analyte specific part of the parametrized function. The set of parameters further comprises parameters for an adjustment of the parametrized function to the hardware components. The evaluation device is further configured for determining calibration values by conducting a calibration based on the parametrized function. The evaluation device is further configured for determining an analysis function on basis of an inverse of the parametrized function and the determined calibration values.

The device may be configured for performing the method for calibrating at least one analytic device as described above or as will further be described below in more detail.

The term "evaluation device" generally refers to an arbitrary device adapted to perform the method steps as described above, typically by using at least one data processing device and, more typically, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the method steps.

In a further aspect, a computer program is disclosed. The computer program is adapted to perform steps b) to c) of the method for calibrating at least one analytic device as described above or as will further be described below in more detail while the program is being executed on a computer or a computer network, specifically on a processor. The computer-program may include computer-executable instructions for performing the method for calibrating at least one analytic device, specifically for performing steps b) to c).

Thus, generally speaking, disclosed and proposed herein is a computer program including computer-executable instructions for performing the method according to an embodiment of the present disclosure in one or more of the embodiments enclosed herein when the program is executed on a computer or computer network. Specifically, the computer program may be stored on a computer-readable data carrier. Thus, specifically, one, more than one or even all of the method steps as indicated above may be performed by using a computer or a computer network, typically by using a computer program. The computer specifically may be fully or partially integrated in a mass spectrometry device, and the computer programs specifically may be embodied as a software. Alternatively, however, at least part of the computer may also be located outside the mass spectrometry device.

In a further aspect, a computer program comprising program means for performing steps b) to c) of the method for calibrating at least one analytic device as described above or as will further be described below in more detail while the computer program is being executed on a computer or on a computer network is disclosed. Specifically, the program means may be stored on a storage medium readable to a computer.

In a further aspect, a computer program product having program code means is disclosed. The program code means can be stored or are stored on a storage medium, for performing steps b) to c) of the method for calibrating at least one analytic device as described above or as will further be described below in more detail when the program code means are executed on a computer or on a computer network. Specifically, the program code means may be stored on a computer-readable data carrier. As used herein, a computer program product refers to the program as a tradable product. The product may generally exist in an arbitrary format, such as in a paper format, or on a computer-readable data carrier. Specifically, the computer program product may be distributed over a data network.

In a further aspect, a computer or computer network comprising at least one processor is disclosed. The processor is adapted to perform steps b) to c) of the method for calibrating at least one analytic device as described above or as will further be described below in more detail.

In a further aspect, a computer loadable data structure that is adapted to perform steps b) to c) of the method for calibrating at least one analytic device as described above or as will further be described below in more detail while the data structure is being executed on a computer is disclosed.

In a further aspect, a storage medium is disclosed wherein a data structure is stored on the storage medium and wherein the data structure is adapted to perform steps b) to c) of the method for calibrating at least one analytic device as described above or as will further be described below in more detail after having been loaded into a main and/or working storage of a computer or of a computer network. The storage medium may specifically refer to a data carrier. The data structure may be loaded into a computer or computer network, such as into a working memory or main memory of the computer or computer network, and the method may be executed.

The method for calibrating at least one analytic device, the device for calibrating at least one analytic device, the computer or computer network and the computer program, according to and embodiment of the present disclosure may provide a large number of advantages over known methods, devices, computers and computer programs.

With the proposed approach a calibration burden on the analytic device may be lower than with common individual stream calibration approaches. Further, an adjustment of a calibration function for each stream may be ensured. Simplified, the proposed approach can be seen as average calibration function over all streams with stream individual adjustment factors.

In order to be able to fit the parametrized function, the calibrator sample may be measured on each individual hardware component and the information from which of the hardware components the signal comes from may also enter a fitting process. As all hardware components may be regarded together for the fitting process, less calibrator measurements may be needed to obtain reliable calibration curves for all hardware components, compared with common prior art approaches, where each hardware component is regarded individually. In addition, quality control checks on the signals over the different hardware components can be made, this is usually not possible in the case of an individual calibration of each hardware component.

The method according to an embodiment the present disclosure can be applied for arbitrary multiplexed system items like detector units or reagent containers and can also generally be applied to most analytical techniques.

Summarizing and without excluding further possible embodiments, the following embodiments may be envisaged:

Embodiment 1: A method for calibrating at least one analytic device with repeated hardware components, wherein the analytic device comprises a plurality of hardware components, wherein the method comprises the following steps:
  a) providing at least one calibrator sample i having a known target value of a concentration of at least one analyte;
  b) at least one measuring step, wherein the measuring step comprises conducting at least one measurement on the calibrator sample using the analytic device, wherein at least one detector signal $s_{ijk}$ is acquired, wherein i= 1, . . . l with l≥2, wherein i refers to the number of the calibrator sample, j=1, . . . J with J≥2, wherein j refers to the number of the hardware component, wherein k=1, . . . $K_{ij}$ with $K_{ij}$≥1, wherein k refers to the number of repetition of the measurement step;
  c) at least one calibration step, wherein a relationship between the detector signal and the concentration of the analyte and/or between the detector signal and a theoretical signal value is determined, wherein the calibration step comprises:
    c.1: providing at least one parametrized function, wherein the parametrized function has a set of parameters, wherein the set of parameters comprises parameters describing an analyte specific part of the parametrized function, wherein the set of parameters further comprises parameters for an adjustment of the parametrized function to the hardware components;
    c.2: determining calibration values by conducting a calibration based on the parametrized function; and
    c.3: determining an analysis function on basis of an inverse of the parametrized function and the determined calibration values.

Embodiment 2: The method according to the preceding embodiment, wherein the set of parameters is expressed by $p=(p_1, p_2, \ldots p_n, h_1, h_2, \ldots h_r)$, wherein n and r are positive integers, wherein $p_1, p_2, \ldots p_n$ correspond to the parameters describing the analyte-specific part of the parametrized function, wherein $h_1, h_2, \ldots h_r$ refer to vectors describing the parameters for the adjustment of the parametrized function to the hardware components, wherein the calibration values are expressed by $\hat{p}=\hat{p}_1, \hat{p}_2, \ldots \hat{p}_n, \hat{h}_1, \hat{h}_2, \ldots \hat{h}_r)$.

Embodiment 3: The method according to any one of the preceding embodiments, wherein the relationship between the detector signal and the theoretical signal value is determined, wherein the parametrized function is a signal adjustment function.

Embodiment 4: The method according to the preceding embodiment, wherein the signal adjustment function is defined by $g_p$(theoretical signal)=detector signal.

Embodiment 5: The method according to any one of the preceding embodiments, wherein the relationship between the detector signal and the concentration of the analyte is determined, wherein the parametrized function is a signal-concentration-function.

Embodiment 6: The method according to the preceding embodiment, wherein the signal-concentration-function is defined by $f_p$(concentration)=detector signal.

Embodiment 7: The method according to any one of the two preceding embodiments, wherein the signal-concentration-function is a linear function.

Embodiment 8: The method according to the preceding embodiment, wherein the signal-concentration function comprises one or both of a hardware-piece specific intercept, a hardware-piece specific slope.

Embodiment 9: The method according to any one of the three preceding embodiments, wherein the signal-concentration-function is a linear function with at least one hardware-piece specific adjustment factor.

Embodiment 10: The method according to any one of the preceding embodiments, wherein the analytic device a device for the determination of the concentration of an analyte in fluids.

Embodiment 11: The method according to any one of the preceding embodiments, wherein the analytic device is selected from the group consisting of: a mass spectrometry device, specifically a liquid chromatography mass spectrometry device; an immunoassay analyzer; a photometric measurement device, blood gas analyzers, hematology analyzers, DNA analyzers.

Embodiment 12: The method according to any one of the preceding embodiments, wherein the hardware components are equivalent hardware components.

Embodiment 13: The method according to any one of the preceding embodiments, wherein the hardware components are selected from the group consisting of: a column, specifically a high performance liquid chromatography column; a stream, specifically a high performance liquid chromatography stream; a sample injection device, specifically a high performance liquid chromatography injection device; a pump; a measurement cell; a detector, specifically a mass spectrometric detector.

Embodiment 14: The method according to any one of the preceding embodiments, wherein the calibrator sample runs through some or all of the hardware components or is transported via some or all of the hardware components.

Embodiment 15: The method according to any one of the preceding embodiments, wherein step b) is conducted on each of the hardware components.

Embodiment 16: A device for calibrating at least one analytic device with repeated hardware components comprising:

at least one analytic device comprising a plurality of hardware components, wherein the analytic device is configured for conducting at least one measurement on a calibrator sample i having a known target value of a concentration of at least one analyte, wherein the analytic device is configured to acquire at least one detector signal $s_{ijk}$, wherein i=1, . . . l with l≥2, wherein i refers to the number of the calibrator sample, j=1, . . . J with J≥2, wherein j refers to the number of the hardware component, wherein k=1, . . . $K_{ik}$ with $K_{ij}$≥1, wherein k refers to the number of repetition of a measurement step; and at least one evaluation device, wherein the evaluation device is configured for conducting at least one calibration step, wherein a relationship between the detector signal and the concentration of the analyte and/or between the detector signal and a theoretical signal value is determined, wherein the evaluation device is configured for providing at least one parametrized function, wherein the parametrized function has a set of parameters, wherein the set of parameters comprise parameters describing an analyte specific part of the parametrized function, wherein the set of parameters further comprise parameters for an adjustment of the parametrized function to the hardware components, wherein the evaluation device is further configured for determining calibration values by conducting a calibration based on the parametrized function, wherein the evaluation device is further configured for determining an analysis function on basis of an inverse of the parametrized function and the determined calibration values.

Embodiment 17: The device according to the preceding embodiment, wherein the device is configured for performing the method for calibrating at least one analytic device according to any one of the preceding claims referring to a method for calibrating at least one analytic device.

Embodiment 18: A computer or computer network comprising at least one processor, wherein the processor is adapted to perform steps b) to c) of the method for calibrating at least one analytic device according to any one of the preceding embodiments referring to a method for calibrating at least one analytic device.

Embodiment 19: A computer loadable data structure that is adapted to perform steps b) to c) of the method for calibrating at least one analytic device according to any one of the preceding embodiments referring to a method for calibrating at least one analytic device while the data structure is being executed on a computer.

Embodiment 20: A computer program, wherein the computer program is adapted to perform steps b) to c) of the method for calibrating at least one analytic device according to any one of the preceding embodiments referring to a method for calibrating at least one analytic device while the program is being executed on a computer.

Embodiment 21: A computer program comprising program means for performing steps b) to c) of the method for calibrating at least one analytic device according to any one of the preceding embodiments referring to a method for calibrating at least one analytic device while the computer program is being executed on a computer or on a computer network.

Embodiment 22: A computer program comprising program means according to the preceding embodiment, wherein the program means are stored on a storage medium readable by a computer.

Embodiment 23: A storage medium, wherein a data structure is stored on the storage medium and wherein the data structure is adapted to perform steps b) to c) of the method for calibrating at least one analytic device according to any one of the preceding embodiments referring to a method for calibrating at least one analytic device after having been loaded into a main and/or working storage of a computer or of a computer network.

Embodiment 24: A computer program product having program code means, wherein the program code means can be stored or are stored on a storage medium, for performing steps b) to c) of the method for calibrating at least one analytic device according to any one of the preceding embodiments referring to a method for calibrating at least one analytic device when the program code means are executed on a computer or on a computer network.

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the present disclosure is not restricted to the typical embodiments. The embodiments are schematically depicted in the Figures. Therein, identical reference numbers in these Figures refer to identical or functionally comparable elements.

In order that the embodiments of the present disclosure may be more readily understood, reference is made to the following examples, which are intended to illustrate the disclosure, but not limit the scope thereof.

FIG. 1 shows a device 110 for calibrating at least one analytic device 112. Specifically, the analytic device 112 may be selected from the group consisting of: a mass spectrometry device, specifically a liquid chromatography mass spectrometry device; an immunoassay analyzer; a photometric measurement device, blood gas analyzers, hematology analyzers, DNA analyzers. However, also other kinds of analytic devices may be feasible.

The analytic device 112 comprises a plurality of hardware components 114. The analytic device 112 may specifically be embodied as an analytical system comprising repeated hardware components 114 such as a plurality of repeated hardware components 114. The hardware components 114 may be handled independently or may be coupled, connectable or integratable with each other.

Exemplarily, the analytic device 112 may be a mass spectrometry device 116. For example, the analytic device 112 may be an HPLC multiplexing device. The analytic device 112 may be or may comprise multiple LC systems which are run simultaneously into a single mass spectrometry device. Each of the LC systems may be individual and/or separate from the other LC systems. For example, the analytic device 112 may comprise a plurality of concurrent HPLC separations with a single mass spectrometry device. The hardware components 114 may be selected from the group consisting of: a column, specifically a high performance liquid chromatography column; a stream, specifically a high performance liquid chromatography stream; a sample injection device, specifically a high performance liquid chromatography injection device; a pump; a measurement cell; a detector, specifically a mass spectrometric detector. Also other components may be feasible.

In FIG. 1, exemplarily, the analytic device 112 is shown to comprise a first hardware component 118 and a second hardware component 120. The first hardware component 118 and the second hardware component 120 may exemplarily be columns 122. Further, the analytic device 112 may comprise a further hardware component 124. The further hardware component 124 may be different from the hardware component 118 and the second hardware component 120. Exemplarily, the further hardware component 124 may be a mass spectrometric detector 126.

The analytic device 112 is configured for conducting at least one measurement on a calibrator sample i having a known target value of a concentration of at least one analyte. The analytic device 112 is further configured to acquire at least one detector signal $s_{ijk}$, wherein i=1, . . . l with l≥2, wherein i refers to the number of the calibrator sample, j=1, . . . J with J≥2, wherein j refers to the number of the hardware component, wherein k=1, . . . $K_{ij}$ with $K_{ij}$≥1, wherein k refers to the number of repetition of a measurement step.

Further, the device 110 comprises at least one evaluation device 128. The evaluation device 128 is configured for conducting at least one calibration step, wherein a relationship between the detector signal and the concentration of the analyte and/or between the detector signal and a theoretical signal value is determined. Further, the evaluation device 128 is configured for providing at least one parametrized function, wherein the parametrized function has a set of parameters. The set of parameters comprises parameters describing an analyte-specific part of the parametrized function. The set of parameters further comprises parameters for an adjustment of the parametrized function to the hardware components. The evaluation device 128 is further configured for determining calibration values by conducting a calibration based on the parametrized function. The evaluation device 128 is further configured for determining an analysis function on basis of an inverse of the parametrized function and the determined calibration values.

Figure 2:
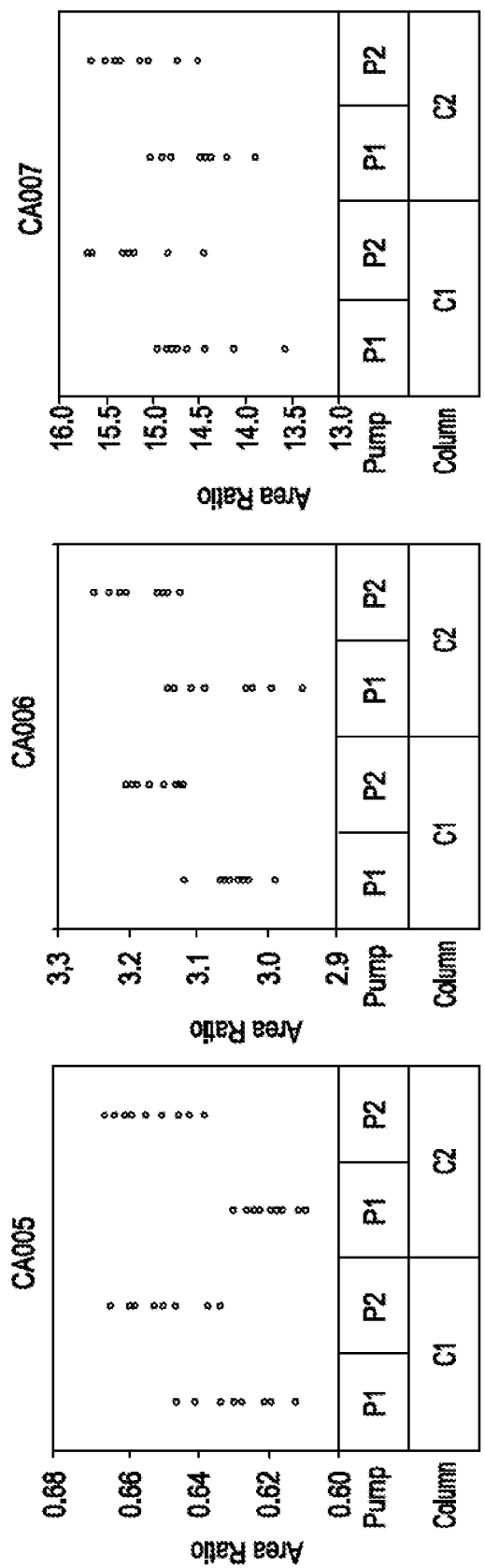
FIGS. 2A to 2D show various experimental results in accordance with an embodiment of the present disclosure.
Figure 2:
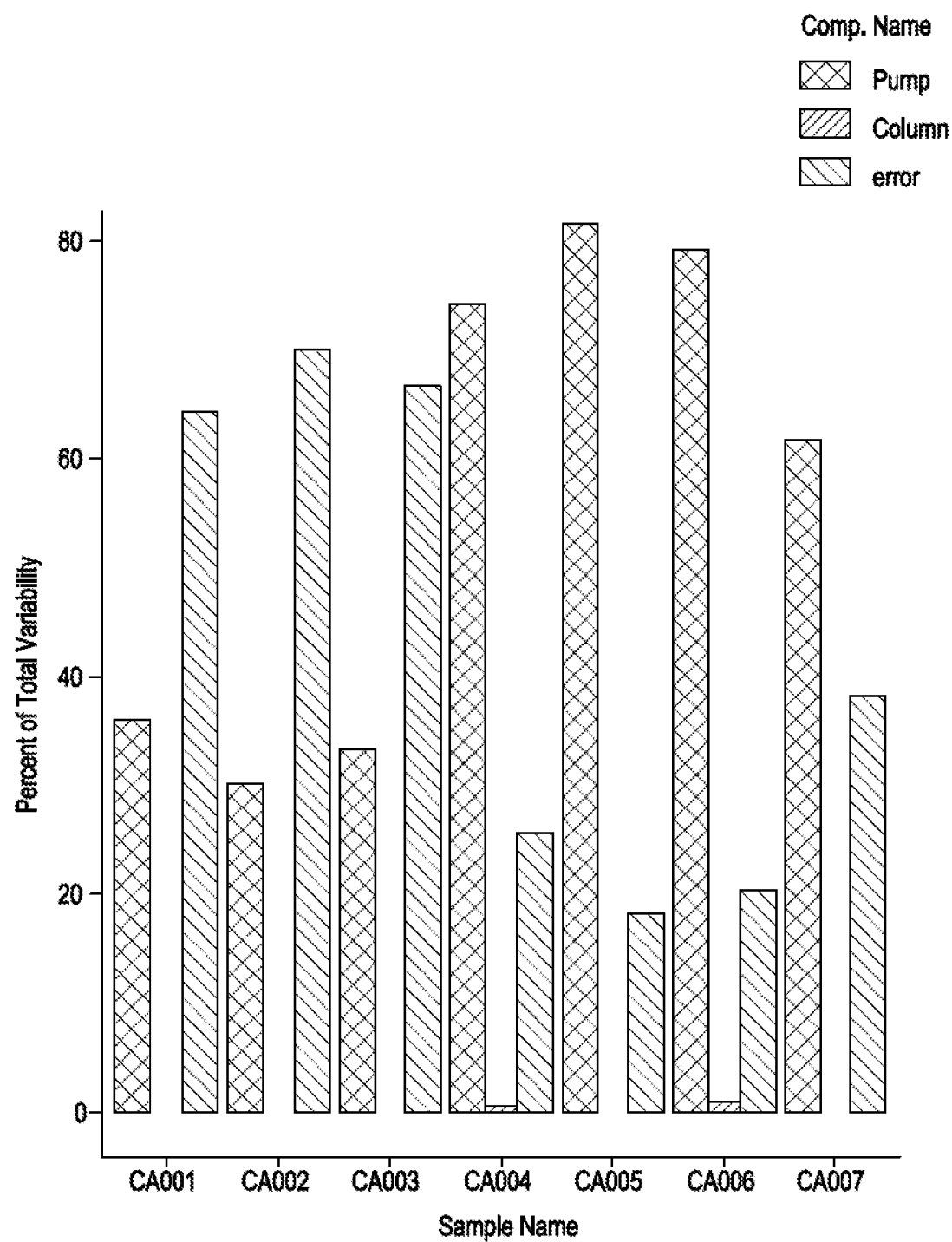
Figure 2:
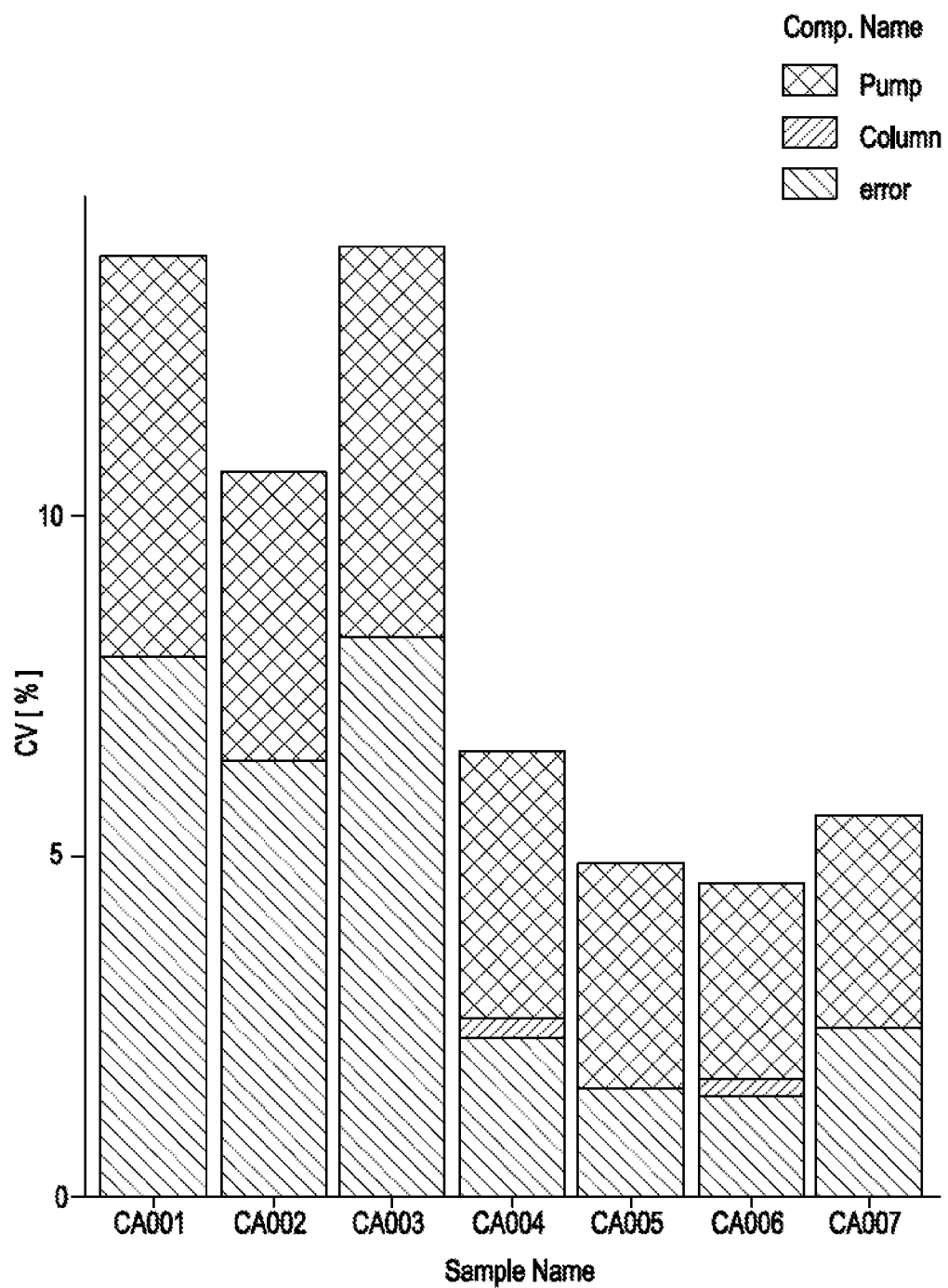
Figure 2D:
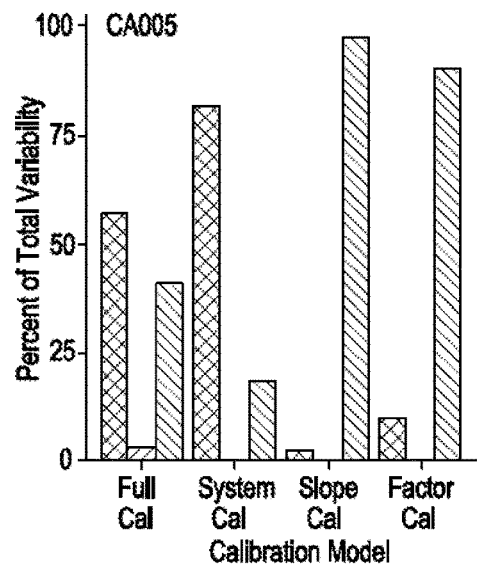
Figure 2D:
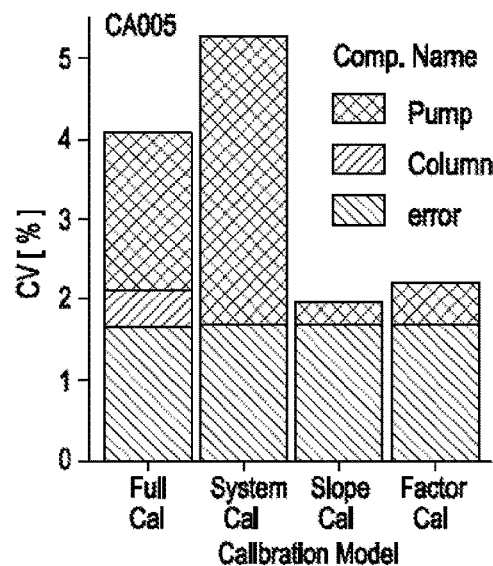
Figure 2D:
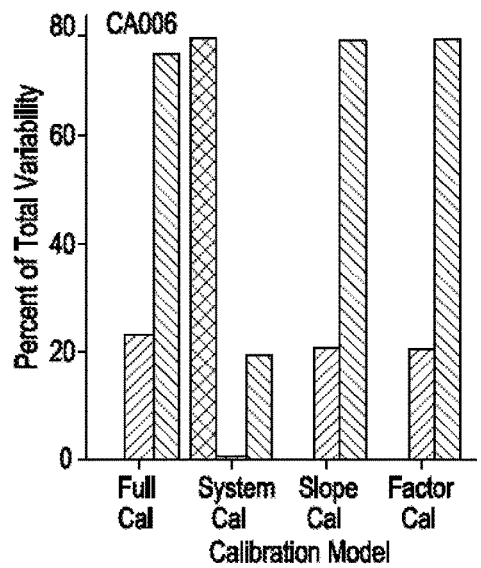
Figure 2D:
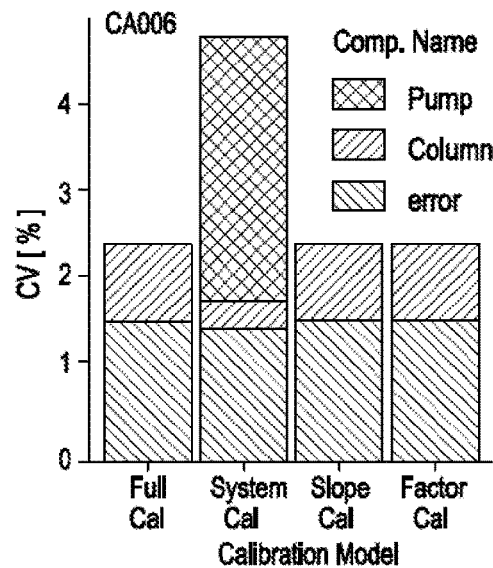
Figure 2D:
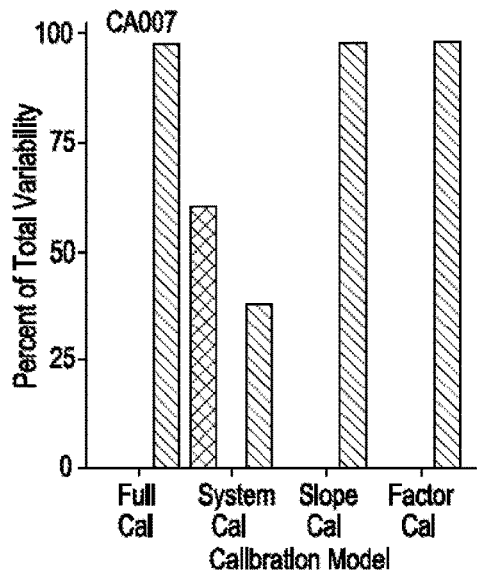
Figure 2D:
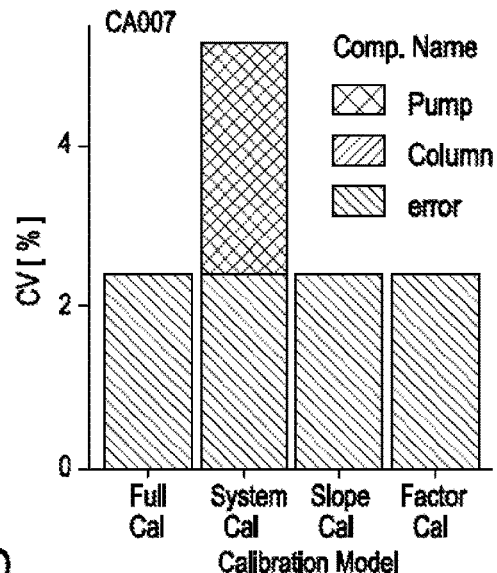

FIGS. 2 A to 2 D show various experimental results. In FIG. 2 A, detector signals, in particular area ratios, are shown for three different samples denoted CA005, CA006 and CA007, acquired on an instrument with two HPLC pumps and two different HPCL columns. The two pumps and columns can be switched together, such that in total there are four different HPLC streams on the instrument. Going from left to right for each sample plot the first data points are the detector signals measured on stream 1, which corresponds to column C1 and pump P1; the second data points are the detector signals measured on stream 2, which corresponds to column C1 and pump P2; the third data points are the detector signals measured on stream 3, which corresponds to column C2 and pump P1 and the fourth data points are the detector signals measured on stream 4, which corresponds to column C2 and pump P2. It can be seen, that the detector signals on stream 2 and 4 are higher than the detector signals acquired on stream 1 and 3.

FIG. 2 B shows results of a variance-component analysis, based on the detector signals. The variance-component analysis was conducted to analyze the main sources of variability coming from differences of the hardware components, and set in relation to the repeatability, i.e., error, component of the system for multiple samples CA001 to CA007 in different concentration ranges. The higher the sample number, the higher is the concentration. In FIG. 2 B the percentage of each component on the total variability is shown. It is seen, that the variability component pump is present, i.e., there is significant variability in detector signals between the two different pumps and therefore between the four HPLC streams.

FIG. 2 C shows the coefficient of variation CV in % for the different variance sources. It can be seen that for all samples there is a significant contribution to the CV due to the variabilities of the detector signal between the two pumps, which is one part of the HPLC streams. With the calibration method according to an embodiment of the present disclosure, it may be possible to minimize the stream differences in the read concentrations.

FIG. 2 D shows the percentage of a total % (left column) as well as the coefficient of variation CV (right column) for samples CA005, CA006 and CA007, when
    an individual stream calibration was conducted (denoted "Full Cal." in FIG. 2 D)
    a calibration with no stream specific parameters was conducted (denoted "System Cal." In FIG. 2 D)

a calibration with a stream specific slope was conducted (denoted "Slope Cal." in FIG. 2 D)

a calibration with a stream specific factor was conducted (denoted "Factor Cal." in FIG. 2 D), wherein the later twos are methods according to an embodiment of the present disclosure. For the model with the stream specific slope calibration, a linear function was fitted, with common intercept between the streams and different slopes. For the model with the stream specific slope calibration, a linear function was fitted, with common intercept between the streams and different slopes. For the model with the stream specific factor calibration, a linear function was fitted, with common intercept and slope between the streams together with a stream-specific multiplicative adjustment factor.

It can be seen that both methods according to an embodiment of the present disclosure work and deliver as good as or even better results to the individual stream calibration and allow to minimize between stream differences for the concentration values. With both methods the between-pump variability in concentration values can be minimized.

LIST OF REFERENCE NUMBERS 110 device
112 analytic device
114 hardware component
116 mass spectrometry device
118 first hardware component
120 second hardware component
122 column
124 further hardware component
126 mass spectrometric detector
128 evaluation device

What is claimed is:

1. A method for calibrating at least one analytic device with repeated hardware components, wherein the analytic device comprises a plurality of hardware components, wherein hardware components are physical and/or tangible parts of the analytic device, wherein the method comprises the following steps:
  a) providing at least one calibrator sample i having a known target value of a concentration of at least one analyte;
  b) at least one measuring step, wherein the measuring step comprises conducting at least one measurement on the calibrator sample using the analytic device (112), wherein at least one detector signal $s_{ijk}$ is acquired, wherein i=1, . . . I with I≥2, wherein i refers to the number of the calibrator sample, j=1, . . . J with J≥2, wherein j refers to the number of the hardware component, wherein k=1, . . . $K_{ij}$ with $K_{ij}$≥1, wherein k refers to the number of repetition of the measurement step;
  c) at least one calibration step, wherein a relationship between the detector signal and the concentration of the analyte is determined, wherein the calibration step comprises:
    c.1: providing at least one parametrized function, wherein the parametrized function has a set of parameters, wherein the set of parameters comprises parameters describing an analyte-specific part of the parametrized function, wherein the set of parameters further comprises parameters for an adjustment of the parametrized function to the hardware components;
    c.2: determining calibration values by conducting a calibration based on the parametrized function; and
    c.3: determining an analysis function on basis of an inverse of the parametrized function and the determined calibration values.

2. A method for calibrating at least one analytic device with repeated hardware components, wherein the analytic device comprises a plurality of hardware components, wherein hardware components are physical and/or tangible parts of the analytic device, wherein the method comprises the following steps:
  A) providing at least one calibrator sample i having a known target value of a concentration of at least one analyte and a mean calibration curve, from which theoretical signals of the at least one calibrator sample are derived;
  B) at least one measuring step, wherein the measuring step comprises conducting at least one measurement on the calibrator sample using the analytic device, wherein at least one detector signal $s_{ijk}$ is acquired, wherein i=1, . . . I with I≥1, wherein i refers to the number of the calibrator sample, j=1, . . . J with J≥2, wherein j refers to the number of the hardware component, wherein k=1, . . . $K_{ij}$ with $K_{ij}$≥1, wherein k refers to the number of repetition of the measurement step;
  C) at least one calibration step, wherein a relationship between the detector signal and a theoretical signal value is determined, wherein the calibration step comprises:
    providing at least one parametrized function, wherein the parametrized function has a set of parameters, wherein the set of parameters comprises parameters describing an analyte-specific part of the parametrized function, wherein the set of parameters further comprises parameters for an adjustment of the parametrized function to the hardware components;
    determining calibration values by conducting a calibration based on the parametrized function; and
    determining an analysis function on basis of an inverse of the parametrized function and the determined calibration values.

3. The method according to claim 1, wherein the method further comprises conducting at least one measurement of a further sample, wherein, by using the analysis function, a concentration of the further sample is determined on basis of a measurement signal of the further sample.

4. The method according to claim 2, wherein the method further comprises conducting at least one measurement of a further sample, wherein, by using the analysis function, a concentration of the further sample is determined on basis of a measurement signal of the further sample.

5. The method according to claim 1, wherein the set of parameters is expressed by $p=(p_1, p_2, \ldots p_n, h_1, h_2, \ldots h_r)$, wherein n and r are positive integers, wherein $p_1, p_2, \ldots p_n$ correspond to the parameters describing the analyte specific part of the parametrized function, wherein $h_1, h_2, \ldots h_r$ refer to vectors describing the parameters for the adjustment of the parametrized function to the hardware components, wherein the calibration values are expressed by $\hat{p}=\hat{p}_1, \hat{p}_2, \ldots \hat{p}_n, \hat{h}_1, \hat{h}_2, \ldots \hat{h}_r$).

6. The method according to claim 1, wherein the relationship between the detector signal and the theoretical signal value is determined, wherein the parametrized function is a signal adjustment function.

7. The method according to claim 1, wherein the relationship between the detector signal and the concentration of the analyte is determined, wherein the parametrized function is a signal-concentration-function.

8. The method according to claim 7, wherein the signal-concentration-function is a linear function.

9. The method according to claim 8, wherein the signal-concentration function comprises one or both of a hardware-piece specific intercept, a hardware-piece specific slope.

10. The method according to claim 8, wherein the signal-concentration-function is a linear function with a hardware-piece specific adjustment factor.

11. The method according to claim 1, wherein the analytic device is selected from the group consisting of: a mass spectrometry device; an immunoassay analyzer; a photometric measurement device; blood gas analyzers; hematology analyzers; and DNA analyzers.

12. The method according to claim 11, wherein the mass spectrometry device is a liquid chromatography mass spectrometry device.

13. The method according to claim 1, wherein the hardware components are equivalent hardware components.

14. The method according to claim 1, wherein the hardware components are selected from the group consisting of: a column; a stream; a sample injection device; a pump; a measurement cell; and a detector.

15. The method according to claim 14, wherein the column is a high performance liquid chromatography column; wherein the stream is a high performance liquid chromatography stream; wherein the sample injection device is a high performance liquid chromatography injection device; and/or wherein the detector is a mass spectrometric detector.

16. The method according to claim 1, wherein the calibrator sample runs through some or all of the hardware components or is transported via some or all of the hardware components.

17. A device for calibrating at least one analytic device with repeated hardware components, wherein hardware components are physical and/or tangible parts of the analytic device, the device comprising:

at least one analytic device comprising a plurality of hardware components, wherein the analytic device is configured for conducting at least one measurement on a calibrator sample i having a known target value of a concentration of at least one analyte, wherein the analytic device is configured to acquire at least one detector signal $s_{ijk}$, wherein i=1, . . . l with l≥2, wherein i refers to the number of the calibrator sample, j=1, . . . J with J≥2, wherein j refers to the number of the hardware component, wherein k=1, . . . $K_{ij}$ with $K_{ij}$≥1, wherein k refers to the number of repetition of a measurement step; and at least one evaluation device, wherein the evaluation device is configured for conducting at least one calibration step, wherein a relationship between the detector signal and the concentration of the analyte and/or between the detector signal and a theoretical signal value is determined, wherein the evaluation device is configured for providing at least one parametrized function, wherein the parametrized function has a set of parameters, wherein the set of parameters comprises parameters describing an analyte-specific part of the parametrized function, wherein the set of parameters further comprises parameters for an adjustment of the parametrized function to the hardware components, wherein the evaluation device is further configured for determining calibration values by conducting a calibration based on the parametrized function, wherein the evaluation device is further configured for determining an analysis function on basis of an inverse of the parametrized function and the determined calibration values.

18. A computer or computer network comprising at least one processor, wherein the processor is adapted to perform steps b) to c) and/or B) to C) of the method for calibrating at least one analytic device according to claim 1 referring to a method for calibrating at least one analytic device.

19. A computer program, wherein the computer program is adapted to perform steps b) to c) and/or B) to C) of the method for calibrating at least one analytic device according to claim 1 referring to a method for calibrating at least one analytic device while the program is being executed on a computer.

* * * * *